Patented Apr. 15, 1924.

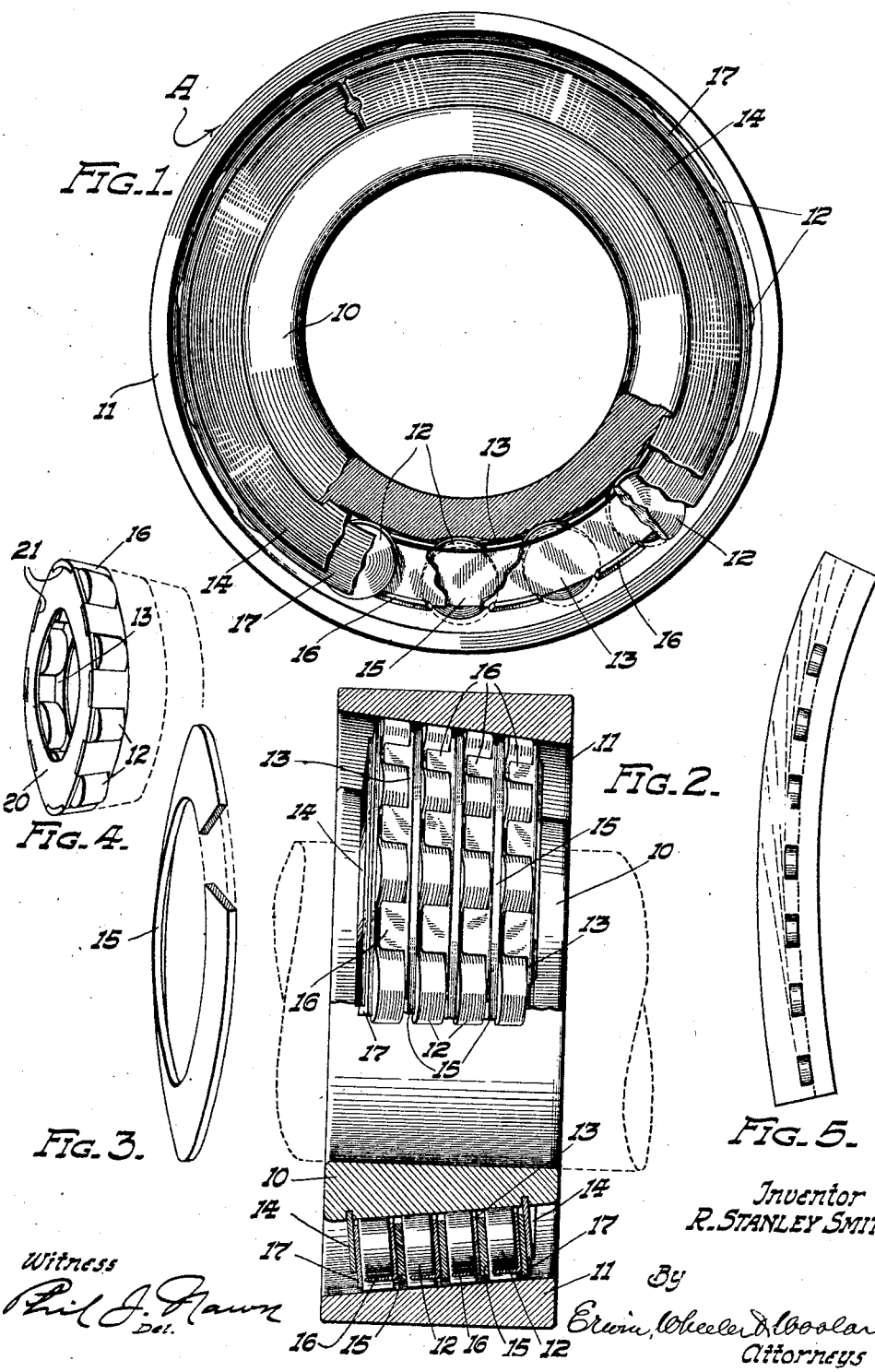

1,490,347

UNITED STATES PATENT OFFICE.

REUBEN STANLEY SMITH, OF MILWAUKEE, WISCONSIN, ASSIGNOR, BY MESNE ASSIGNMENTS, TO A. O. SMITH CORPORATION, OF MILWAUKEE, WISCONSIN, A CORPORATION OF WISCONSIN.

ROLLER BEARING.

Application filed January 3, 1921. Serial No. 434,526.

*To all whom it may concern:*

Be it known that I, REUBEN STANLEY SMITH, a citizen of the United States, and a resident of the city of Milwaukee, county of Milwaukee, and State of Wisconsin, have invented a certain new and useful Improvement in Roller Bearings; and I do declare the following to be a clear, exact, and complete description thereof, such as will enable others skilled in the art to which the invention pertains to make and use the same, reference being had to the accompanying drawing for the details of a construction in which my invention has been embodied.

This invention relates to roller bearings of the type in which cone bearing surfaces are used, and in which the rollers are arranged so as to sustain the radial thrusts as well as the axial thrusts, which are imposed upon such bearings under the conditions which attend their use when carrying a load.

The present invention involves an improvement upon the roller bearing disclosed in my Patent #1,072,667, Sept. 9, 1913.

In roller bearings of this type, the conical surfaces of the bearings or rings which receive the thrusts referred to, present parallel concentric surfaces which extend at an angle to the axis of the shaft or axle, and the parallel lines of which converge at separated points, determined by the diameter of the rollers and the angularity of the generating line of the cones. It was the older practice to form the multiplicity of single, elongated, cylindrical rollers, which space apart the bearing surfaces, of a length approximately equal to that of the width of the conical surfaces upon which they bear. In constructions in which cone bearings are used, there are differential rates of travel in the same conical bearing surfaces, due to the different diameters of such surfaces. The rollers referred to have generally been mounted in a freely rotatable circular cage, which is cut out or recessed to receive and space the elongated rollers from each other, and at the same time preserve their converging axial arrangement, in parallelism with the conical bearing surfaces. Also, the diameter of the cylinders constituting the elongated rollers has exceeded slightly the thickness of the cage, so as to enable such rollers to extend beyond and clear of the inner and outer circular planes of the cage, and have a rolling engagement with the parallel bearing surfaces.

Constructions of this kind have not been satisfactory in the way of practical operation. This negative result exists by reason of the fact that one end of each of the rollers travels in a circular path, the diameter of which exceeds that of the circular path traversed by the other end of the roller, the conical bearing surfaces tending to create differential rotations at the ends of the elongated rollers. As a result of this construction, the elongated rollers are subject to very great strains which are productive of excessive friction and wear in adjusting themselves to the differential movements forced upon them. In the operation of a roller bearing thus constructed, the opposing strains incident thereto have been carried entirely by the elongated rollers, which have been so inelastic as to resist such strains, and which strains are absorbed by the slipping of the rollers upon the conical bearing surfaces, with the result that such opposing strains are concentrated at the central line of the roller, at which point they are equalized but not neutralized.

As an improvement upon the older construction, in which the series of single, elongated rollers are of a length approximating the width of the bearing, it has been proposed to divide each of the said rollers into a plurality of sections, and to mount the said sectional or disc rollers in the cage so that their axial coincidence is maintained as in the first construction. This second form of roller bearing, however, developed a peculiar manifestation not present in the prior structure, in that the opposing thrusts upon the rollers of the bearing, instead of being carried by single, elongated rollers, were transmitted by the sectional or disc rollers directly to the carrying cage, with the result that the same forces which created the differential movements, previously described as inherent to the operation of roller bearings having conical bearing surfaces, acted to distort the structure of the cage and produce a twisted condition therein about its axis which destroyed its serviceability, in a degree which has prevented the commercial utilization of a roller bearing of the second type described.

In the third form of roller bearing, as disclosed in my prior patent hereinbefore referred to, and after much study of the conditions attending the use of these roller bearings, and an extensive manufacturing experience, I overcame the objections inherent to the roller bearings provided with a cage carrying a plurality of series of sectional or disc rollers which are maintained in axial alignment, by dividing the cage into parts or separate cages equal in number to the several series of circumferentially arranged disc rollers, so that each cage with its series of disc rollers was free to rotate independently at a faster or lower rate of speed, dependent upon the arrangement of the particular cage and its independent and separate series of rollers in axial relation to the conical bearing surfaces with which the roller bearing forming parts of my patented improvement are provided. The cages in my first improved roller bearing, as disclosed in the said patent, were formed as conical or dished rings of different diameter, the webs of which stood in planes normal to the parallel conical surfaces of the bearing. The said rings were provided with outer angular projections extending from one side of the web thereof, and which projections served to separate and maintain in spaced relation the disc rollers of each independent series. The web of the conical ring referred to abutted the sides of adjacent rollers. Thus the sides of the ring acted to separate the series of rollers from each other, and retain them in the relative positions in which they were placed in the cage, when the parts constituting the roller bearing were assembled. My patented roller bearing as thus constructed completely overcame the objections and defects inherent both to the roller bearing constructed with elongated rollers, and the roller bearing in which the sectional or disc rollers were mounted in a cage with a view to the preservation of their fixed axial alignment, as well.

However, I have discovered, with reference to my patented bearing, that the end thrusts upon the bearing when carrying a load, have a tendency to create an undue frictional engagement of the abutting sides of the disc rollers of the several series with the web of the adjoining cage ring. This frictional engagement I find to be due to the tendency of the disc rollers to depart from the circumferential line of travel about the inner conical surface, and participate in a tangential movement which causes them to bear heavily upon the abutting web of the cage ring. The frictional resistance thus created serves to impede in a considerable degree, the absolutely free and independent movement of the respective cages, by reason of the differential rates of travel thereof. It is also found that the lateral pressures applied are localized in areas determined by the diameter of the disc rollers.

To overcome these defects in the operation of my previously patented roller bearings, I have produced the present invention. Such invention consists in the association with each cage and its corresponding series of disc rollers, of a separating ring, developed in the form of a cone, the web of which together with that of the cage, are in parallel planes which stand perpendicular to the conical bearing surface. By the interpositioning of such separating rings, the web of the cage is entirely relieved on one of its sides from frictional engagement by the disc rollers, whereby such frictional engagement is transferred to and exerted against the interpositioned conical ring. The cage and separating ring, together with the series of disc rollers arranged between the cage and the ring, constitute a unit, which is adapted to have movement independently of the movements of the like contiguous units of the roller bearing. The lateral engagement of the web of the cage of one unit with the web of the separating ring of the adjacent unit, effects a distribution of the pressure over the whole of the area of the contiguous units, whereby the separate units are enabled to participate in their differential movements without encountering the frictional resistance present in my former patented construction, and by means of which arrangement, the web of the cage is relieved on one side, of the wear resulting from pressure in the bearing.

Inasmuch as the conical separating rings are quite economical in cost of manufacture, when compared with the cost of producing the cages, my present invention serves to materially prolong the life of the bearing at an added cost which is slight, when measured by the results achieved.

The novel features of my invention will be pointed out in the appended claims.

In the drawings which accompany this specification, Figure 1 shows a view in side elevation of my improved bearing, the view being taken from the left of Fig. 2, and partly broken out to show the arrangement of the parts.

Fig. 2 is a vertical sectional view, through the axis of the bearing, parts of the cages being shown in full lines.

Fig. 3 is a perspective view of one of the conical separating rings which I employ in my improved bearing.

Fig. 4 is a perspective view of a modified construction of the conical separating rings.

Fig. 5 is a development of the inner conical bearing surface, showing the line of travel of the disc rollers thereover, and indicating also the tendency of such rollers to depart from such line of travel.

In the drawings, my improved bearing as a whole is indicated by the letter A, in Figure 1. This bearing, so far as the formation and concentric arrangement of the bearing members 10 and 11 are concerned, is the same as that disclosed in my prior patent hereinbefore referred to. The members 10 and 11 have parallel conical bearing surfaces, adapted to be spaced from each other by the insertion of a plurality of circumferentially arranged disc rollers 12 therein, the said disc rollers 12 being spaced apart by means of independently rotating cages 13, and held from lateral movement when assembled in the bearings by means of split spring rings 14, seated in circumferential grooves in the member 10, as usual. The cage and the series of circumferential rollers carried thereby may be considered as a unit in my improved bearing. For the purpose of relieving one of the sides of the web of the cage from the frictional engagement created by the contiguous series of disc rollers, a conical separating ring 15, the flat faces of which lie in circular planes parallel to the sides of the disc rollers, and which rings stand in a plane normal to the parallel lines of the conical bearing surfaces of the members 10 and 11, and so relieve the web of the cage from any tendency to wear by reason of its frictional contact with the disc rollers on one side thereof.

As in my prior patent, the disc rollers 12, arranged in circumferential series together with the independent cage 13, which spaces them in the series by means of the angular or lateral projections 16 formed upon the cage, are free to rotate each independently of the other, and thus partake of rotations at different speeds, dependent upon the varying diameters of the surfaces about which they rotate, thus completely eliminating the opposing strains inseparable from the older form of roller bearings.

It will be understood that while the disc rollers will be of uniform diameter, the carrying cages will vary in diameter to accord with that of the conical surfaces in connection with which the disc rollers carried by the cages cooperate.

Integral retaining rings 17, similar in formation to the separating rings 15, may be placed at one or both sides of the assembled bearing, if desired. The lateral spacing projections 16, upon the cages, may be of any desired form.

Fig. 4 illustrates a modified form of the conical separating rings 20, such modified rings being constructed with peripheral notches 21, which are adapted to be entered by the angular projection 16, formed upon the cage, it being understood that when the said projections upon the cage are designed to be used in connection with the notched separating ring 20, the said projections will be lengthened somewhat so as to exceed the thickness of the disc rollers 12 and enter the said notches 21.

The cage and the separating ring, together with the series of disc rollers arranged and spaced circumferentially therein, constitute one unit, a suitable number of which units will be assembled to form the bearing.

In Fig. 5, I have shown the development of the inner conical bearing surface, and have indicated by dotted lines the circumferential path to which the disc rollers are confined in their travel. By broken lines in the said figure, I have indicated the tangential path which the said disc rollers have a tendency to follow, in their movement of rotation about the conical bearing surface. This tendency causes the disc rollers to bear heavily against the web of the adjacent cage with a pressure which is conducive to considerable wear upon the cage, and which interferes with the free and independent movement of the separate series of cages and rollers incorporated in the bearing. The interpositioning of the separating ring relieves the web of the contiguous cage from this frictional engagement by the disc rollers of the first cage. The pressure is thereby transmitted to the separating ring, which ring bears with a pressure which is evenly distributed over the area of the web of the adjacent cage, so that the wear described as taking place in the latter is greatly reduced.

It is obvious that the separating rings 15 may be used in relation to the roller units other than as specifically shown. It will be within the scope of my invention to arrange a pair of the independent cages 13 with the lateral projections 16 for spacing the disc rollers 12 opposed to each other, and interpose the separating ring between the units so arranged.

Having thus described my invention, what I claim and desire to secure by Leters Patent of the United States, is:

1. In a roller bearing, axially extending cylindrical members provided with opposed conical bearing surfaces, and a plurality of roller units interposed between and separating the bearing surfaces, each roller unit comprising a circumferentially arranged row of disc roller and an independently rotatable annular carrying cage therefor, the latter being dished so that the web thereof stands in a plane normal to that of the conical bearing surface and provided with laterally extending spacing projections for separating the disc rollers of such circumferential row, the disc rollers of the row bearing at one side against the inner side of the web of the carrying cage, in combination with separating rings dished to stand in parallelism with the webs of the cages disposed between and spacing the roller units axially from each other and bearing against the other side of the disc rollers of the row, to relieve the web of the adjacent cage from wear upon its outer side by the pressure of the row of disc rollers.

2. In a roller bearing, axially extending cylindrical members provided with opposed conical bearing surfaces, and a plurality of roller units interposed between and separating the bearing surfaces, each roller unit comprising a circumferentially arranged row of disc roller and an independently rotatable annular carrying cage therefor, the latter being dished so that the web thereof stands in a plane normal to that of the conical bearing surface and provided with laterally extending spacing projections for separating the disc rollers of such circumferential row, the disc rollers of the row bearing at one side against the inner side of the web of the carrying cage, in combination with separating rings dished to stand in parallelism with the webs of the cages disposed between and spacing the roller units axially from each other.

3. In a roller bearing, axially extending cylindrical members provided with opposed conical bearing surfaces, and a plurality of roller units interposed between and separating the bearing surfaces, each roller unit comprising a circumferentially arranged row of disc rollers and an independently rotatable annular carrying cage therefor, the latter being dished so that the web thereof stands in a plane normal to that of the conical bearing surface and provided with laterally extending spacing projections for separating the disc rollers of such circumferential row, in combination with independent flat separating rings dished to stand in parallelism with the webs of the cages disposed between and spacing the roller units axially from contact with each other.

4. In a roller bearing, axially extending cylindrical members provided with opposed conical bearing surfaces, and a plurality of roller units interposed between and separating the bearing surfaces, each roller unit comprising a circumferentially arranged row of disc rollers and an independently rotatable annular carrying cage therefor, the latter being dished so that the web thereof stands in a plane normal to that of the conical bearing surface and provided with laterally extending spacing projections for separating the disc rollers of such circumferential row, the disc rollers of the row bearing at one side against the inner side of the web of the carrying cage, in combination with separating rings dished to stand in parallelism with the webs of the cages disposed between and spacing the roller units axially from each other and bearing against the other side of the disc rollers of the row, to relieve the web of the adjacent cage from wear upon its outer side by the pressure of the row of disc rollers, the said separating rings being provided with openings to receive the free ends of the spacing projections on the cage to complete a closure for the row of disc rollers.

In testimony whereof, I have signed my name at Milwaukee, this 29th day of December, 1920.

R. STANLEY SMITH.

Witnesses:
W. F. WOOLARD,
GLADYS McGHEE.